(12) United States Patent
Morita et al.

(10) Patent No.: US 6,844,061 B2
(45) Date of Patent: Jan. 18, 2005

(54) FINE CARBON FIBER AND COMPOSITION THEREOF

(75) Inventors: Toshio Morita, Kawasaki (JP); Ryuji Yamamoto, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 127 days.

(21) Appl. No.: 10/220,817

(22) PCT Filed: Jul. 31, 2002

(86) PCT No.: PCT/JP02/07816
§ 371 (c)(1),
(2), (4) Date: Sep. 6, 2002

(87) PCT Pub. No.: WO03/014441
PCT Pub. Date: Feb. 20, 2003

(65) Prior Publication Data
US 2004/0009348 A1 Jan. 15, 2004

Related U.S. Application Data

(60) Provisional application No. 60/311,116, filed on Aug. 10, 2001.

(30) Foreign Application Priority Data

Aug. 3, 2001 (JP) ...................................... 2001-269505

(51) Int. Cl.⁷ .................................................. D01F 6/00
(52) U.S. Cl. ........................ 428/367; 428/398; 428/376
(58) Field of Search ................................ 428/367, 408, 428/398, 376; 423/447.1

(56) References Cited

U.S. PATENT DOCUMENTS

| | | | |
|---|---|---|---|
| 4,663,230 A | 5/1987 | Tennent | |
| 6,489,025 B2 * | 12/2002 | Morita et al. | 428/367 |
| 6,565,971 B2 * | 5/2003 | Morita et al. | 428/367 |

| | | | |
|---|---|---|---|
| 2002/0015845 A1 | 2/2002 | Morita et al. | |

FOREIGN PATENT DOCUMENTS

| | | |
|---|---|---|
| EP | 0 136 497 A | 4/1985 |
| JP | 60-27700 A | 2/1985 |
| JP | 60-54998 A | 3/1985 |
| JP | 61-70014 A | 4/1986 |
| JP | 3-64606 B2 | 10/1991 |
| JP | 2778434 B2 | 5/1998 |
| JP | 2003183939 A * | 7/2003 |

OTHER PUBLICATIONS

Patent Abstracts of Japan, abstracting JP–A–07–150419, Jun. 13, 1995, corresponding to JP–B–2778434, May 8, 1998.

Ting et al, "Formation of nodulated vapor grown carbon fiber", Carbon, vol. 38, No. 14, pp. 1917–1923 (2000), published by Elsevier Science Publishing.

* cited by examiner

*Primary Examiner*—N. Edwards
(74) *Attorney, Agent, or Firm*—Sughrue Mion, PLLC

(57) ABSTRACT

A fine carbon fiber, the main body of each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers, the layers forming concentric rings, wherein the fiber filament has a nodular portion which is formed of outwardly protruding carbon layers or formed of a locally increased number of carbon layers. A similar fine carbon fiber, in which the fiber filament has repeatedly enlarged protruding portions and the filament diameter varies along with the length of the filament, the ratio of the diameter (d") of a fiber filament of the fiber as measured at the outwardly enlarged portions to the diameter (d) of a fiber filament of the fiber as measured at a position at which no outwardly enlarged portions is present; i.e., d"/d, being about 1.05 to about 3, is also provided.

10 Claims, 10 Drawing Sheets

5nm

FINE CARBON FIBER AND COMPOSITION THEREOF

CROSS-REFERENCE TO RELATED APPLICATION

This application is an application filed under 35 U.S.C. §111(a) claiming benefit pursuant to 35 U.S.C. §119(e)(1) of the filing date of the provisional Application 60/311,116 filed on Aug. 10, 2001, pursuant to 35 U.S.C. §111(b).

TECHNICAL FIELD OF THE INVENTION

The present invention relates to fine carbon fiber having a specific structure and to a composition comprising the carbon fiber and, more particularly, to fine carbon fiber which is suitable as a filler used in composite materials, such as resin- or rubber-based composite materials, and as a semiconductor material, a catalyst, and a gas occlusion material, and to a composition comprising the carbon fiber.

BACKGROUND ART

Carbon fiber is used in a variety of composite materials, by virtue of its excellent properties such as high strength, high elastic modulus, and high electrical conductivity. Since carbon fiber serving as a carbon material exhibits excellent mechanical properties, carbon fiber has been utilized in a variety of fields. In recent years, because of its electrical conductivity in addition to the excellent electrical conductivity, in conjunction with developments in electronic techniques, carbon fiber has been considered a promising filler in conductive resin for producing electromagnetic wave shielding material or antistatic material, and has been viewed as a useful filler which can be incorporated into the resin for electrostatic coating. Also, by virtue of its chemical stability, thermal stability, and fine structure, carbon fiber has been considered a promising field emission material for use in, for example, flat displays.

Conventional carbon fiber; i.e., organic material-based carbon fiber, is produced by subjecting an organic fiber, such as PAN-, pitch-, or cellulose-based fiber, to heat treatment and carbonization. When such carbon fiber is used as a filler in fiber reinforced composite material, in order to increase the contact area between the carbon fiber and the matrix of the material, desirably, the diameter of the fiber is reduced or the length thereof is increased. As a result, the reinforcement effect on the composite material is enhanced. In order to improve adhesion between the carbon fiber and the matrix, the carbon fiber desirably has a rough surface rather than a smooth surface. Therefore, the carbon fiber is subjected to surface treatment; for example, the carbon fiber is oxidized by exposure to air at high temperature, or the surface of the fiber is subjected to coating.

However, conventionally, carbon fiber having a small diameter has been impossible to produce, since its raw material; i.e., organic fiber filaments, has a diameter of about 5 to 10 $\mu$m. Furthermore, a limitation is imposed on the ratio of length to diameter (i.e., aspect ratio) of conventional carbon fiber. Therefore, keen demand has arisen for development of carbon fiber with a small diameter and a high aspect ratio.

When carbon fiber is incorporated into resin used for producing an automobile body, or into resin or rubber for producing an electronic device, the carbon fiber must exhibit electrical conductivity comparable to that of metal. Therefore, in order to meet requirements for a variety of electrical conductive paints and electrical conductive resins, carbon fiber serving as a filler material has been required to exhibit improved electrical conductivity.

In order to improve electrical conductivity, carbon fiber must be subjected to graphitization. Therefore, in general, carbon fiber is subjected to graphitization at a high temperature. However, even when carbon fiber is subjected to such graphitization, the carbon fiber fails to attain electrical conductivity comparable to that of metal. Therefore, when the carbon fiber is employed in the aforementioned material, in order to compensate for low electrical conductivity of the carbon fiber, a large amount of the carbon fiber must be incorporated into the material. As a result, workability and mechanical properties of the material are impaired. In view of the foregoing, demand has arisen for further improvements to the electrical conductivity of carbon fiber, and enhancement of the strength of the carbon fiber by reducing its diameter.

In the late 1980's, studies were conducted on Vapor Grown Carbon Fiber (hereinafter abbreviated as "VGCF") produced through a process which differs from that used for producing the aforementioned organic carbon fiber.

VGCF is known to be produced through thermal decomposition of a gas of, for example, hydrocarbon in a vapor phase in the presence of an organo-transition metallic catalyst. Through this process, carbon fiber having a diameter of less than 1 $\mu$m down to hundreds of nm can be produced.

A variety of processes for producing VGCF have been disclosed, including a process in which an organic compound such as benzene, serving as a raw material, and an organo-transition metallic compound such as ferrocene, serving as a metallic catalyst, are introduced into a high-temperature reaction furnace together with a carrier gas, to thereby produce VGCF on a substrate (Japanese Unexamined Patent Publication (kokai) No. 60-27700); a process in which VGCF is produced in a floating state (Japanese Unexamined Patent Publication (kokai) No. 60-54998); and a process in which VGCF is grown on a reaction furnace wall (Japanese Patent No. 2778434).

The aforementioned processes can produce carbon fiber of relatively small diameter and high aspect ratio which exhibits excellent electrical conductivity and is suitable as a filler material. Therefore, carbon fiber having a diameter of about 100 to about 200 nm and an aspect ratio of about 10 to about 500 can be mass-produced, and is used, for example, as an electrically conductive filler material in resin or as an additive in lead storage batteries.

A characteristic feature of the VGCF filament resides in its shape and crystal structure. A VGCF filament has a cylindrical structure including a very thin hollow space in its center portion, and a plurality of carbon hexagonal network layers grown around the hollow space so as to form concentric rings.

Iijima et al. have discovered a multi-layer carbon nano-tube, which is a type of carbon fiber having a diameter smaller than that of the above VGCF, in soot produced by evaporating a carbon electrode through arc discharge in helium gas. The multi-layer carbon nano-tube has a diameter of 1 to 30 nm, and is a fine carbon fiber filament having a structure similar to that of a VGCF filament; i.e., the tube has a cylindrical structure including in its center portion a hollow space extending along the filament, and a plurality of carbon hexagonal network layers grown around the hollow space so as to form concentric rings.

However, the above process for producing the nano-tube through arc discharge has not yet been put into practice, because the process is not suitable for mass production.

Meanwhile, production of carbon fiber of high aspect ratio and exhibiting high electrical conductivity through the vapor-growth process is thought to be feasible, and therefore attempts have been made to improve the vapor-growth process for the production of carbon fiber of smaller diameter. For example, U.S. Pat. No. 4,663,230 and Japanese Examined Patent Publication (kokoku) No. 3-64606 disclose a graphitic cylindrical carbon fibril having a diameter of about 3.5 to 70 nm and an aspect ratio of 100 or more. The carbon fibril has a structure in which a plurality of layers of regularly arranged carbon atoms are continuously disposed concentrically about the cylindrical axis of the fibril, and the C-axis of each of the layers is substantially perpendicular to the cylindrical axis. The entirety of the fibril includes no thermal carbon overcoat deposited through thermal decomposition, and has a smooth surface.

Japanese Unexamined Patent Publication (kokai) No. 61-70014 discloses a carbon fiber having a diameter of 10 to 500 nm and an aspect ratio of 2 to 30,000, which fiber is produced through a vapor-growth process. According to this publication, a carbon layer obtained through thermal decomposition has a thickness of 20% or less of the diameter of the carbon fiber.

The aforementioned carbon fibers exhibit poor adhesion, wettability, and affinity, since they have smooth surfaces. Therefore, when such a carbon fiber is used in a composite material, the fiber must be subjected to surface treatment; for example, the surface of the fiber must be subjected to sufficient oxidation. Meanwhile, when such a carbon fiber is used as a gas occlusion material, the carbon fiber desirably has many hollow spaces.

In view of the foregoing, an object of the present invention is to provide, on a mass-production scale, fine carbon fiber which has a diameter of 500 nm or less, exhibits high electrical conductivity and excellent adhesion to materials such as resin, and is suitable as a filler material. Another object is to provide carbon fiber material exhibiting excellent gas occlusion.

SUMMARY OF THE INVENTION

In order to achieve the aforementioned objects, the present invention provides the following:

(1) A fine carbon fiber, the main body of each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers around the hollow space, wherein the fiber filament has a nodular portion which is formed of outwardly protruding carbon layers or formed of a locally increased thickness of the carbon layers;

(2) A fine carbon fiber according to (1) above, wherein the ratio of the diameter (d') of a fiber filament of the fiber as measured at a position at which a nodular portion is present on the surface of the filament to the diameter (d) of a fiber filament of the fiber as measured at a position at which no nodular portion is present; i.e., d'/d, is more than about 1.5 and not more than about 10;

(3) A fine carbon fiber according to (1) or (2) above, wherein the nodular portion present on the surface of a fiber filament of the fiber has a cavity; or the nodular portion contains, in its interior, carbon particles or carbon, or a metal or a metallic compound;

(4) A fine carbon fiber according to (1) or (2) above, wherein the nodular portion present on the surface of a fiber filament of the fiber is formed from carbon, and has a sheath structure extending along the center axis of the fiber filament;

(5) A fine carbon fiber, each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers around the hollow space, wherein the fiber filament has repeatedly outwardly enlarged portions and the fiber filament diameter varies along the length of the fiber filament, the ratio of the diameter (d") of a fiber filament of the carbon fiber as measured at the outwardly enlarged portions to the diameter (d) of a fiber filament of the carbon fiber as measured at a position at which no outwardly enlarged portions is present; i.e., d"/d, being about 1.05 to about 3;

(6) A fine carbon fiber as recited in (5) above, wherein the filament of the fine carbon fiber has locally thicker carbon multi-layer structure portions containing voids in the carbon multi-layer structure;

(7) A fine carbon fiber as recited in (5) or (6) above, wherein the length of the outwardly enlarged portions of a fiber filament of the fiber is about 2 to about 200 times the diameter (d) of the fiber filament;

(8) A fine carbon fiber in which the fine carbon fiber as recited in (1) to (7) above occupies about 5 to about 95% by mass in a fine carbon fiber having an outer diameter of about 1 to about 500 nm and an aspect ratio of about 10 to about 15,000; and (9) A fine carbon fiber composition comprising a resin or a rubber and a fine carbon fiber, as recited in any one of (1) through (8) above, contained therein.

MODES FOR CARRYING OUT THE INVENTION

The present invention will next be described in detail.

In order to obtain fine carbon fiber, each fiber filament of the fiber having an outer diameter of about 500 nm or less, exhibiting high electrical conductivity and excellent adhesion to materials such as resin, and being is suitable as a filler material, the present inventors have performed extensive studies on production conditions for fine VGCF, and have found that fine carbon fiber assuming a conventionally unknown shape is produced under specific production conditions, and that the carbon fiber exhibits high electrical conductivity, excellent adhesion to materials such as resin, and excellent gas occlusion. The fine carbon fiber of the present invention is one form of the carbon fibers which are produced during the course of production of fine VGCF.

Next, the fine carbon fiber of the present invention will be described.

Characteristic features of the fine carbon fiber of the present invention will be described with reference to the attached drawings (FIGS. 1 through 6)

As in the case of conventional fine carbon fiber, each fiber filament of the fine carbon fiber of the present invention has a diameter of about 1 to about 500 nm, preferably about 5 to about 200 nm, and an aspect ratio of about 10 to about 15,000, preferably about 10 to about 10,000, and the main body of each fiber filament has a hollow space extending along its center axis and a multi-layer sheath structure consisting of a plurality of carbon layers around the hollow space. A characteristic feature of the fine carbon fiber of the present invention resides in that the fiber has a nodular portion or variation of the filament diameter as described below.

Figure 1:
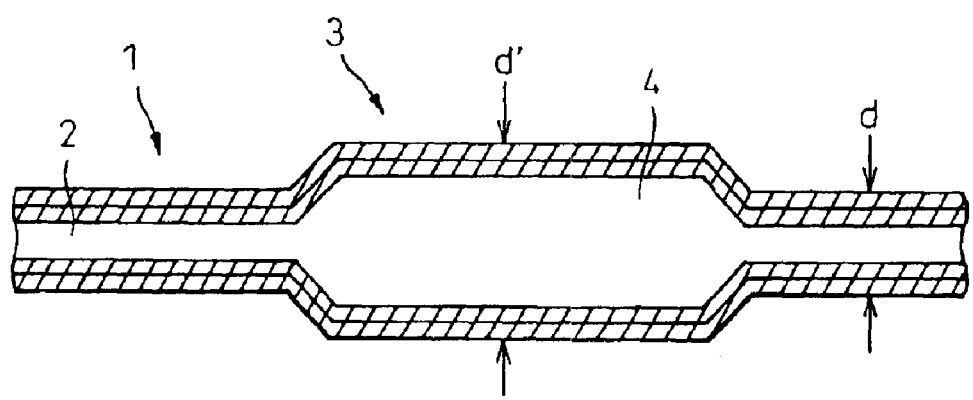
FIGS. 1 through 6 are schematic cross-sectional views illustrating the structures of fiber filaments of the fine carbon fibers of the present invention.

A fine carbon fiber filament 1 shown in FIG. 1 has a hollow space 2, and a nodular portion 3 having a large-diameter multi-layer sheath structure of carbon layers. The nodular portion has a cavity (hollow space) 4. The thickness of the carbon multi-layer of the nodular portion 3 is substantially the same as that of the carbon multi-layer of the main body of the fine carbon fiber filament 1. However, the thickness of the carbon multi-layer of the nodular portion 3 may be greater than or less than that of the carbon multi-layer of the main body of the fine carbon fiber filament 1. In some cases, the hollow space of a fine carbon fiber filament which has yet to be graphitized contains metallic catalyst particles (metal carbide particles), fine carbon pieces, or hollow carbon fine particles. In such a case, a nodular portion as shown in FIG. 1 is conceivably, but not necessarily, formed through the following mechanism: during the growth process of a fine carbon fiber filament, numerous metallic catalyst particles (metal carbide particles) are taken into the fiber filament, and a fine carbon fiber filament containing the metallic catalyst particles is formed; the metallic catalyst particles (metal carbide particles) are gasified in the course of graphitization of the resultant carbon fiber filament; and graphitization of the carbon fiber filament further proceeds under the effect of the gasified catalyst particles, to thereby extend a carbon multi-layer outwardly such that a plane structure is formed.

In the present invention, the maximum diameter (d') of a fine carbon fiber filament as measured at a nodular portion is greater than the diameter (d) of the main body of the fine carbon fiber filament. The diameter (d') is typically about 1.5 to about 10 times the diameter (d), preferably about 2 to about 6 times the diameter (d).

Figure 2:
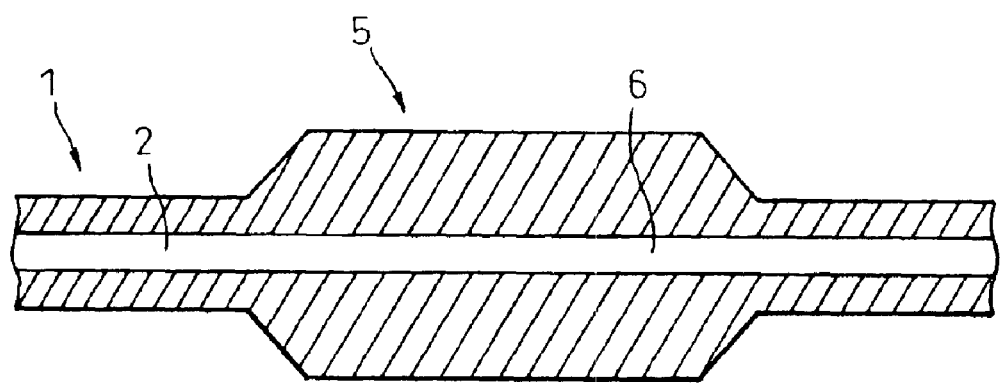

The fine carbon fiber filament 1 shown in FIG. 2 is similar in appearance to the fine carbon fiber filament shown in FIG. 1, but the fine carbon fiber filament 1 shown in FIG. 2 has a nodular portion 5 formed of an outwardly protruding carbon multi-layer of increased thickness. The nodular portion 5 is formed of a carbon multi-layer, and a hollow space 6 is considered to have substantially the same structure as that of a hollow space 2 of the main body of the fine carbon fiber filament 1. Under a transmission electron microscope, a sheath structure of a plurality of carbon layers is observed in the nodular portion. A thick portion of the fine carbon fiber filament 1; i.e., the nodular portion 5, is considered to be formed through a process in which, after a normal fine carbon fiber filament is grown, a carbon multi-layer is formed starting from the outer surface of a portion of the fiber filament under certain production conditions. That is, the nodular portion 5 is considered to be formed as a result of growth of a carbon multi-layer outwardly in the course of graphitization of the fine carbon fiber filament. Alternatively, the nodular portion 5 shown in FIG. 2 may be formed as follows: while a fine carbon fiber filament is grown under certain initial conditions, as a result of some changes in production conditions, an additional carbon multi-layer is grown around the growing fine carbon fiber filament, to thereby form a thick portion on the carbon fiber filament, which returns to the original shape when the production conditions return to the initial conditions.

Figure 3:
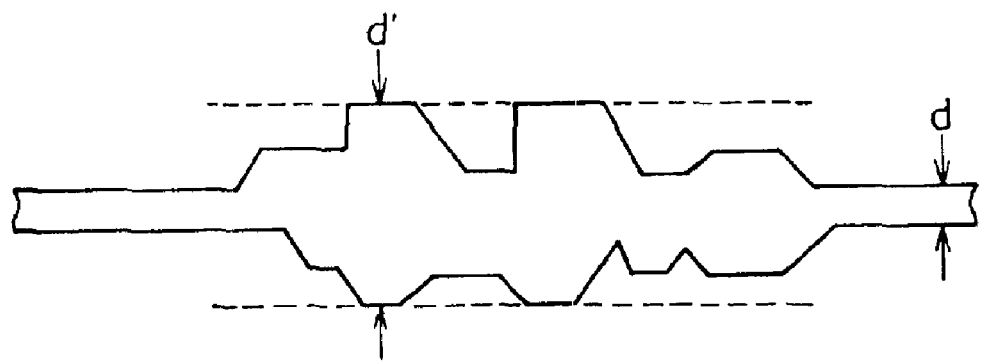

A fine carbon fiber filament shown in FIG. 3 has various nodular portions assuming different shapes and sizes. Angles of the nodular portions at which the diameter is increased or decreased are not uniform, and lengths of the nodular portions are not uniform. In addition, lengths of nodular portions having a uniform diameter are not uniform, and some nodular portions are asymmetrical with respect to the center axis of the carbon fiber filament. That is, in the middle of the carbon fiber filament, a carbon multi-layer is grown so as to form a shape different from that of the main body of the carbon fiber filament; typically, a carbon multi-layer is grown such that the diameter is increased, to thereby form nodular portions. A characteristic feature of the nodular portions resides in that the portions having abnormal diameters or thicknesses are formed from carbon crystals constituting the fine carbon fiber filament of carbon multi-layer structure such that the carbon crystals are grown in unintended directions. Conventionally, fine carbon fiber on which carbon fine particles are forcedly deposited is proposed, but the fine carbon fiber of the present invention differs from the conventional fine carbon fiber. Observation of the carbon fiber filament under a transmission electron microscope shows that, although growth directions of carbon crystals are not uniform, nodular portions are continuously grown on the fiber filament; i.e., the nodular portions are not formed through deposition of carbon fine particles. In the case where nodular portions assuming non-uniform shape are formed as shown in FIG. 3, the fine carbon fiber filament is considered to be hollow. The hollow space of the fine carbon fiber filament may contain metallic catalyst particles (metal carbide particles), fine carbon pieces, or hollow carbon fine particles.

The fine carbon fiber filament having a shape shown in FIG. 3 may be formed as follows: during the growth of a fine carbon fiber filament, with the intervention of metallic catalyst particles (metal carbide particles) in a tip of the fiber filament, growth of the fiber filament continues, and the growth speed decreases due to local decrease of temperature, and thus the fiber filament is grown in various directions with respect to the center axis of the filament; and subsequently the fiber filament is grown at the initial growth speed, and the shape of the fiber filament returns to the original shape. In some cases, when a fine carbon fiber filament containing, in its hollow space, metallic catalyst particles (metal carbide particles) is graphitized, the metallic catalyst particles (metal carbide particles) are gasified, and during gasification, the fiber filament is deformed and additional carbon layers are grown on the surface of a carbon multi-layer to thereby increase the thickness of the carbon-multi-layer. As a result, nodular portions of complicated shape as shown in FIG. 3 are formed. Alternatively, the nodular portions shown in FIG. 3 are considered to be formed through selective growth of carbon layers on a portion of the fiber filament during firing, as in the case of the nodular portion shown in FIG. 2. That is, the nodular portions shown in FIG. 3 may be formed as a result of combination of various factors.

Figure 4:
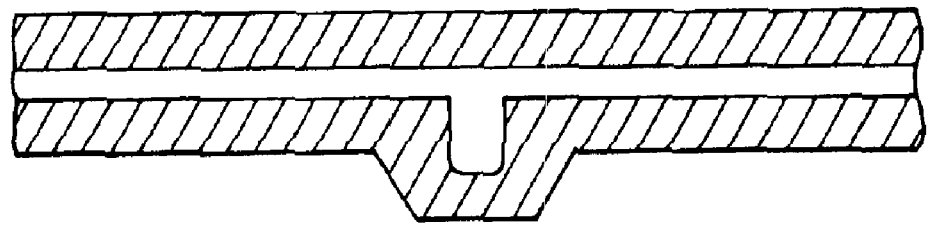

A fine carbon fiber filament shown in FIG. 4 has a nodular portion formed like a short branched carbon fiber filament. The branched, nodular portion has a cavity or a trace thereof. The shape or diameter of a branched, nodular portion may differ from that of the branched, nodular portion shown in FIG. 4. Even in such a case, the outer diameter (d') of the nodular portion is ten times or less the outer diameter (d) of the main body of the carbon fiber filament. Therefore, the carbon fiber filament as shown in FIG. 4 should be distinguished from a branched carbon fiber filament. The carbon fiber filament shown in FIG. 4 is considered to be formed as follows: division of metallic catalyst particles serving as nuclei of growth of fine carbon fiber occurs under a certain effect, and some catalyst particles contribute to growth of the fiber filament and others contribute to growth of the nodular portion.

As described above, the nodular portion of the fine carbon fiber filament may have a cavity, or may contain, in its interior, metallic catalyst particles (metal carbide particles), fine carbon pieces, or hollow carbon fine particles.

Figure 5:
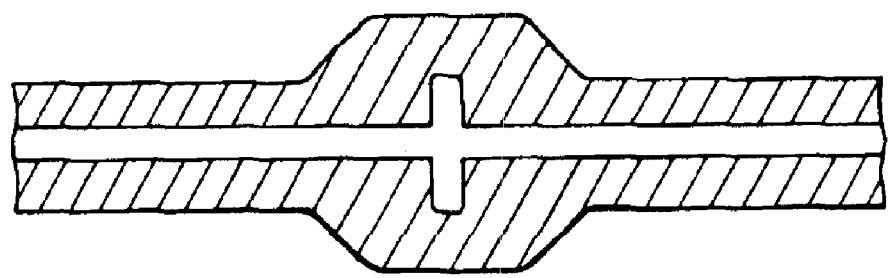

In the fine carbon fiber filament shown in FIG. 5, a plurality of metallic catalyst particles are considered to contribute to growth of a nodular portion having a cavity, as in the case of the fine carbon filament shown in FIG. 4.

No particular limitation is imposed on the length of a nodular portion. The length is typically about 2 to about 30 times the diameter (d) of a fine carbon fiber filament, but may be 30 times or more the diameter (d).

Figure 6:
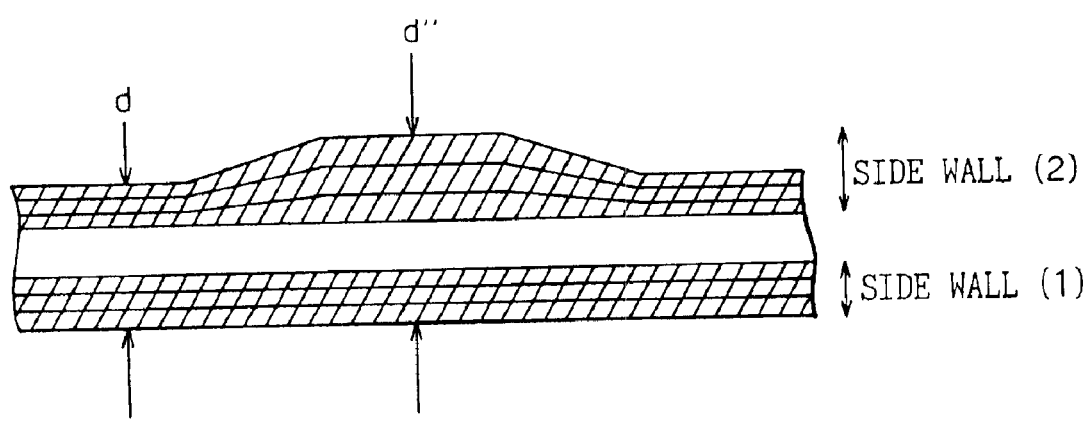

In the fine carbon fiber filament as shown in FIG. 6, only an outwardly enlarged portion of a fine carbon fiber filament is schematically illustrated. The diameter (d") of the outwardly enlarged portion of a carbon fiber filament is almost within about 3 times, usually within about 2 times the filament diameter (d), different from the diameter (d') of the nodular portion, and is not less than about 1.05 times, preferably not less than about 1.1 times, more preferably not less than about 1.2 times the filament diameter (d). The length of the outwardly enlarged portion of a carbon fiber filament is typically in a range of about 2 to about 200 times, more preferably about 2 to about 50 times the filament diameter (d). The outwardly enlarged portions of a carbon fiber filament are repeated through the length of the carbon fiber filament such that the diameter of the fiber filament varies from thin to thick and vice versa preferably along the entire length of the carbon fiber filament.

Figure 7:
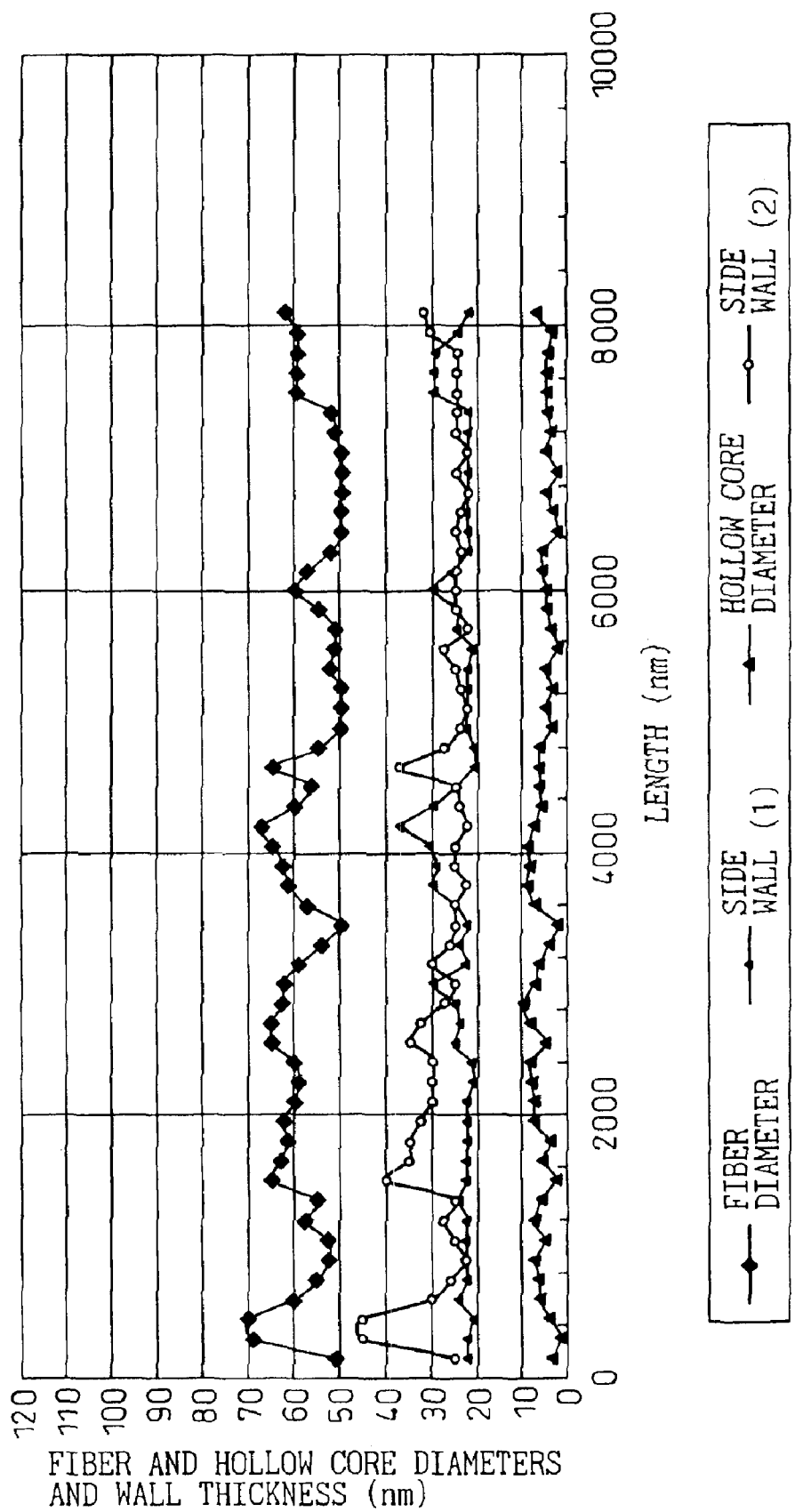
FIG. 7 is a graph showing the filament diameter, carbon multi-layer thickness and hollow space diameter along the filament length of a fine carbon fiber of the present invention.

FIG. 7 shows the variation of the filament diameter of a carbon fiber filament (a filament diameter of 50 nm), together with the carbon multi-layer thicknesses of the lower side wall (1) and upper side wall (2) as defined in FIG. 6 and the diameter of the hollow space of a fine carbon fiber filament, taken along the length of the carbon fiber filament, measured by a transmission electron beam microscope photograph. It is seen in FIG. 7 that the filament diameter of a carbon fiber filament varies within 2 times the filament diameter (d) along the length of the carbon fiber filament; that, although the thickness of the carbon multi-layer structure of each of the lower and upper side walls (1) and (2) varies, the thickness of the lower side wall (1) and that of the upper side wall (2) do not correspond to each other and only one of the lower and upper side walls (1) and (2) varies in most cases; and that although the hollow space diameter also varies, the variation of the thickness of the lower and upper side walls (1) and (2) is larger than that of the hollow space diameter and well corresponds to the variation of the filament diameter. Therefore, it is considered that the variation of the filament diameter is derived mainly from the variation of the thickness of the lower or upper side wall (1) or (2). It was also seen that the outwardly enlarged portions of a fine carbon fiber filament contain voids in the carbon multi-layer structure under observation by transmission electron beam microscopy. Therefore, the formation of voids in the carbon multi-layer structure is a cause of the outwardly enlarged portions of a fine carbon fiber filament, while it is not limited thereto. The length of the outwardly enlarged portions is generally in a range of about 2 to about 200 times, usually about 2 to about 50 times, further about 2 to about 30 times the filament diameter (d) but it is not limited thereto and it may include a portion longer than about 200 times the filament diameter (d).

Typical shapes of nodular portions and outwardly enlarged portions (variation of filament diameter) of filaments of the fine carbon fibers of the present invention are described above. No particular limitation is imposed on the fine carbon fiber of the present invention, so long as the fine carbon fiber contains a nodular portion (outer diameter (d')≦about 10 d) which is formed from carbon crystals constituting the carbon fiber, or the fine carbon fiber filament includes repeated outwardly enlarged portions (about 1.05 d≦outer diameter (d")≦about 3 d) and the diameter of the carbon fiber filament varies along the length of the carbon fiber filament, and each fiber filament of the carbon fiber has a diameter of about 1 to about 500 nm and an aspect ratio of about 10 to about 15,000. The diameter of a hollow space extending along the center axis of the carbon fiber filament may be non-uniform. The fine carbon fiber of the present invention is not affected by amorphous carbon which is present in or around the tip of the carbon fiber formed of carbon layers.

The aforementioned shapes of the fine carbon fibers of the present invention is not known in carbon fibers produced through a variety of conventional vapor-phase processes; i.e., the fine carbon fiber of the present invention is novel.

Unlike conventional carbon fiber, the fine carbon fiber of the present invention has a nodular portion or a filament diameter variation. Therefore, a gas such as hydrogen is easily occluded in the interior of the non-uniform shaped portion. When the fine carbon fiber is incorporated, as an electrically conductive filler, into a resin, adhesion of the carbon fiber to the resin is improved at the surface of the non-uniform shaped portion.

When the fine carbon fiber of the present invention is incorporated into carbon fiber in an amount of at least about 5 mass %, preferably about 5 to about 95 mass %, more preferably about 10 to about 70 mass %, much more preferably about 10 to about 50 mass %, by virtue of the structural feature (i.e., large interior space) of the fine carbon fiber, the amount of a gas such as hydrogen to be occluded in the resultant carbon fiber mixture is increased. When the resultant carbon fiber mixture is incorporated, as an electrically conductive filler, into a resin, adhesion of the fiber mixture to the resin is improved. The structure of the carbon fiber can be confirmed through observation under a transmission electron microscope. When the fine carbon fiber of the present invention is incorporated into fine carbon fiber in an amount of about 3 to about 80 volume %, preferably about 5 to about 70 volume %, more preferably about 10 to about 50 volume %, on the basis of the entirety of the fine carbon fiber, the amount of a gas such as hydrogen to be occluded in the resultant fine carbon fiber is increased. In addition, when the resultant fine carbon fiber is incorporated, as an electrically conductive filler, into a resin, adhesion of the carbon fiber to the resin is improved.

Since each fiber filament of the fine carbon fiber of the present invention has an outer diameter of about 1 to about 500 nm and an aspect ratio of about 10 to about 15,000, the carbon fiber can be incorporated as a filler into a material in a large amount, and the carbon fiber exhibits an excellent reinforcement effect and excellent gas occlusion.

Next will be described preferred processes for producing the fine carbon fiber of the present invention.

The fine carbon fiber of the present invention can be produced through thermal decomposition of an organic compound, particularly a hydrocarbon, in the presence of a transition metal catalyst. Preferably, the resultant fine carbon fiber is subjected to heat treatment at approximately 900 to 1,300° C., in order to remove tar, etc. deposited on the surface of the fiber. Furthermore, the resultant fine carbon is graphitized through heat treatment at approximately 2,000 to 3,500° C., preferably at approximately 2,500 to 3,500° C.

That is, the fine carbon fiber can be produced through thermal decomposition of an organic compound, particularly a hydrocarbon, in the presence of a transition metal catalyst.

Examples of the organic compound which may serve as a raw material of the carbon fiber include organic compounds such as benzene, toluene, xylene, methanol, ethanol, naphthalene, phenanthrene, cyclopropane, cyclopentene, and cyclohexane; volatile oils or gasoline; kerosene; gasses such as CO, natural gas, methane, ethane, ethylene, acetylene, and butadiene; and mixtures thereof. Of these, aromatic compounds such as benzene, toluene, and xylene are particularly preferred.

An organo-transition metallic compound contains a transition metal serving as a catalyst, and is an organic compound containing, as a transition metal, a metal belonging to Group IVa, Va, VIa, VIIa, or VIII of the periodic table. An organo-transition metallic compound such as ferrocene or nickelocene is preferred. The organo-transition metallic compound serving as a catalyst is incorporated into an organic compound in an amount of about 0.5 to about 15 mass %, preferably about 1 to about 10 mass %, more preferably about 2 to about 8 mass %, on the basis of the carbon content of the organic compound.

The present inventors have found that, when the form of a reactor, a reaction system, reaction conditions, the types and amounts of an organic compound and an organo-transition metallic compound serving as a catalyst, and the type and amount of a promoter are appropriately determined and regulated, the fine carbon fiber of the present invention having a nodular portion can be produced.

In order to achieve the object of the present invention, preferably, an organic compound selected from among benzene, toluene, acetylene, ethylene, butadiene, and a mixture thereof is employed in combination with an organo-transition metallic compound selected from among nickelocene and ferrocene. More preferably, benzene and ferrocene are employed in combination.

In the present invention, a promoter is not necessarily employed. However, when a sulfur compound serving as a promoter is employed, and the amount of the sulfur compound employed is increased as compared with the case of production of conventional carbon fiber, the fine carbon fiber of the present invention having a nodular portion or filament diameter variation can be produced in a particularly advantageous manner. No particular limitation is imposed on the type of a sulfur compound, so long as the sulfur compound can be dissolved in an organic compound serving as a carbon source. Examples of the sulfur compound which may be employed include thiophene, various. thiols, and inorganic sulfur. The amount of a sulfur compound as reduced to atomic sulfur is about 0.01 to about 5 mass %, preferably about 0.03 to about 5 mass %, more preferably about 0.5 to about 4 mass %, on the basis of the entirety of an organic compound (i.e., a carbon raw material such as hydrocarbon). When the amount of sulfur is small, fine carbon fiber is grown slowly, and a nodular portion or filament diameter variation fails to be formed. In contrast, when the amount of sulfur is excessively large, merely short, fine carbon fiber is grown.

The inventor has found that a nodular portion or filament diameter variation is formed easily when the amount of a raw material to be fed is large. When the ratio by flow rate of a raw material gas to a carrier gas is about 0.03 or more under standard conditions, a nodular portion or filament diameter variation is formed easily.

Conventionally, it was not known that fine carbon fiber having a nodular portion or filament diameter variation of specific crystal structure and shape can be produced when a reaction system, particularly, the types and amounts of an organic compound and an organo-transition metallic compound serving as a catalyst, and the type and amount of a promoter are appropriately determined and regulated. Also, the utility of the novel fine carbon fiber was not known. Therefore, the fine carbon fiber having such a novel structure provided by the present invention is useful in industry.

A typical reducing gas such as hydrogen gas is employed as a carrier gas. Preferably, the carrier gas is heated to approximately 500 to 1,300° C. in advance. The reason for the preliminary heating of a carrier gas is to generate a metal serving as a catalyst simultaneous with supply of a carbon source obtained through thermal decomposition of a carbon compound in the course of reaction, so as to allow reaction to proceed instantaneously, thereby producing finer carbon fiber. In the case where a carrier gas is mixed with a carbon compound serving as a raw material, when the temperature of the carrier gas is lower than about 500° C., the raw material is not thermally decomposed easily. In contrast, when the temperature of the carrier gas exceeds about 1,300° C., carbon fiber is grown in its radial direction, and the diameter of the fiber tends to become large.

The amount of a carrier gas to be employed is appropriately 1 to 70 parts by mol on the basis of 1.0 part by mol of an organic compound serving as a carbon source. The diameter of carbon fiber to be produced can be regulated by varying the ratio between the carbon source and the carrier gas.

The raw material of carbon fiber is prepared by dissolving an organo-transition metallic compound and a sulfur compound serving as a promoter in an organic compound serving as a carbon source. The raw material may be sprayed in the form of liquid into a reaction furnace by use of a carrier gas. Alternatively, the raw material may be gasified by use of a purge gas (i.e., a portion of a carrier gas), after which the thus-gasified raw material is fed to a reaction furnace to thereby allow the reaction to proceed. In order to produce carbon fiber of small diameter, preferably, the raw material is gasified and then fed to a reaction furnace.

A vertical electric furnace is typically employed as a reaction furnace. The temperature of the reaction furnace is approximately 800 to 1,300° C., preferably approximately 1,000 to 1,300° C. A mixture of a raw material fluid and a carrier gas or a mixture of a gasified raw material and a carrier gas is fed to a reaction furnace heated to a predetermined temperature so as to allow the reaction to proceed, thereby producing carbon fiber.

The raw material gas fed to the reaction furnace as described above is thermally decomposed, the organic compound serves as a carbon source, transition metal particles (i.e., a catalyst) are generated from the organo-transition metallic compound, and fine carbon fiber is grown around the transition metal particles serving as nuclei.

Preferably, the resultant fine carbon fiber is subjected to heat treatment at approximately 900 to 1,500° C. in an atmosphere of an inert gas such as helium or argon, and then further subjected to heat treatment at approximately 2,000 to 3,500° C.; or alternatively, and still more preferably, the crude fine carbon fiber as produced through reaction is subjected to heat treatment at approximately 2,000 to 3,500° C. in an inert gas atmosphere.

The crude fine carbon fiber as produced through reaction, or the fine carbon fiber which has undergone heat treatment at approximately 900 to 1,500° C. in an inert gas atmosphere, may be mixed with a boron compound such as boron carbide ($B_4C$), boron oxide ($B_2O_3$), elemental boron, boric acid ($H_3BO_3$), or a borate, and then further subjected to heat treatment at approximately 2,000 to 3,500° C. in an inert gas atmosphere. No particular limitation is imposed on the amount of a boron compound added to the fine carbon fiber, since the amount varies in accordance with chemical properties and physical properties of the boron compound. For example, when boron carbide ($B_4C$) is employed, the amount of boron carbide is about 0.05 to about 10 mass %, preferably about 0.1 to about 5 mass %, on the basis of the entirety of the fine carbon fiber.

EXAMPLES

The present invention will next be described by way of Examples.

Examples

Figure 8:
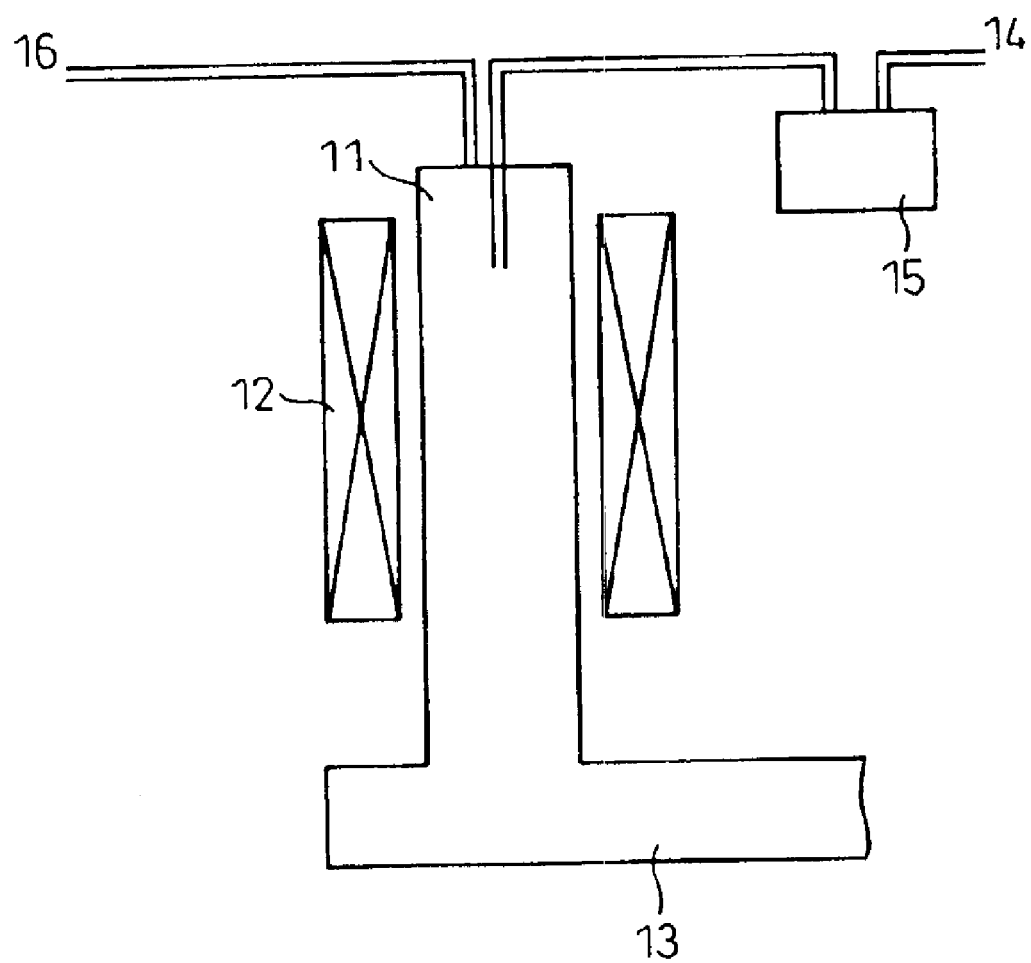
FIG. 8 is a schematic representation showing an apparatus for producing the fine carbon fiber of Examples.

As schematically shown in FIG. 8, a raw material feed pipe 14 for feeding a raw material which had been gasified in a raw material gasification apparatus 15 and a carrier gas feed pipe 16 were provided on the top of a vertical heating furnace 11 (inner diameter: 170 mm, length: 1,500 mm).

Benzene containing ferrocene (4 mass %) and thiophene (3 mass % (1.1 mass % as reduced to atomic sulfur)) was gasified, the gasified product was fed through the raw material feed pipe 14 at a rate of 30 g/minute while the temperature of the product was maintained at 200° C., and hydrogen serving as a carrier gas was fed at a rate of 180 liters/minute, to thereby allow reaction to proceed.

Fine carbon fiber produced through the above reaction was subjected to heat treatment at 1,300° C. in an argon (Ar) atmosphere. The thus-treated fine carbon fiber was further subjected to heat treatment at 2,800° C. in an Ar atmosphere, to thereby obtain fine carbon fiber (yield by mass through heat treatment: 90%).

FIGS. 9 through 13 show transmission electron micrographs of fiber filaments of the thus-produced fine carbon fibers. The fiber filament shown in each of FIGS. 9 through 13 has a diameter of about 10 to about 100 nm and an aspect ratio of about 10 or more, and the main body of the fiber filament has a hollow space extending along its center axis and a multi-layer sheath structure consisting of a plurality of carbon layers.

Figure 9:
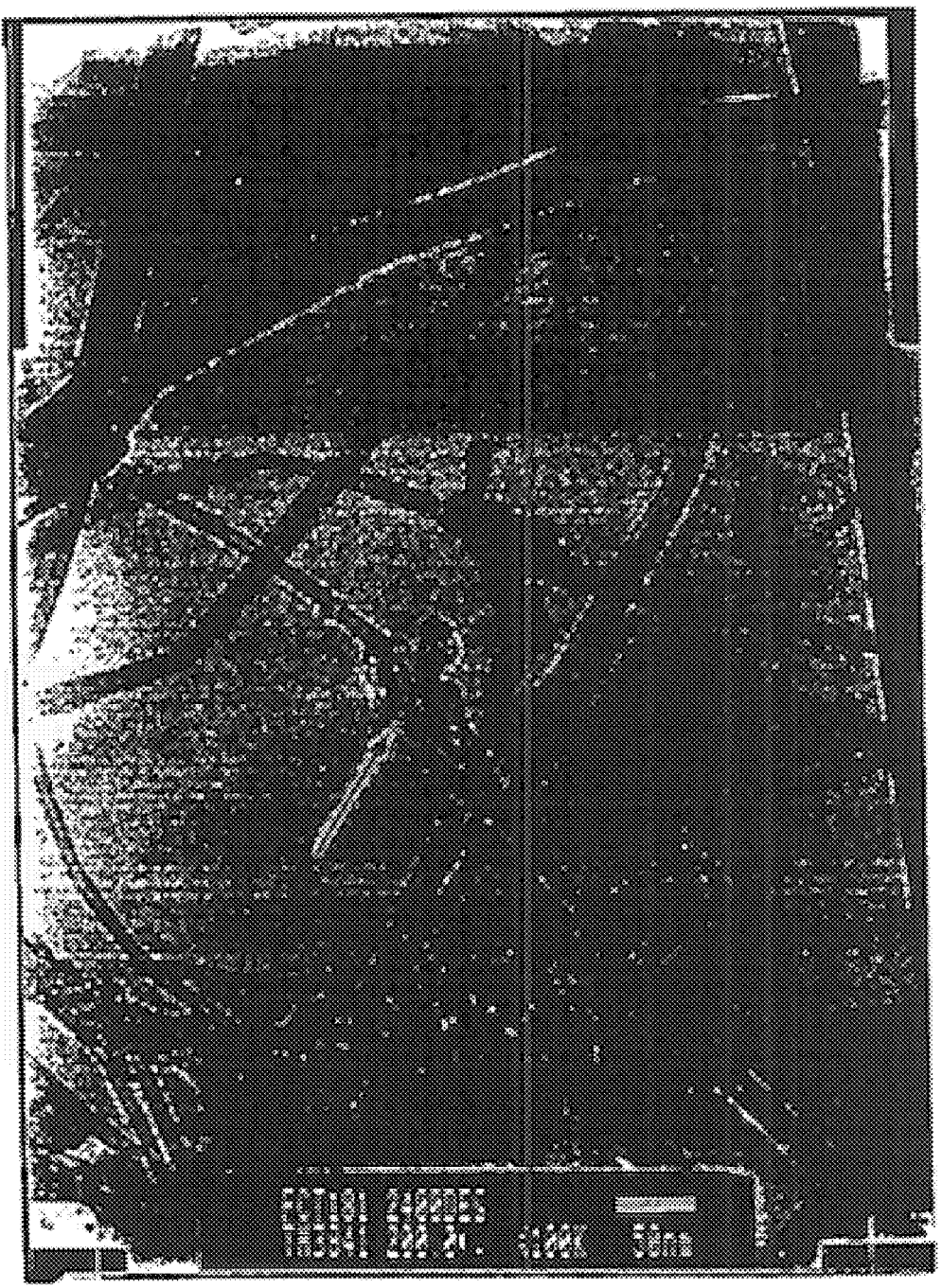
FIGS. 9 through 13 show transmission electron micrographs of fiber filaments of the fine carbon fibers of the Examples.

As shown in FIG. 9, a site indicated by an arrow has nodular portions continuously formed with non-uniform shape portions assuming shapes as shown in the schematic representation of FIG. 3 on the surface of a carbon fiber filament. The composite nodular portion indicated by the arrow has a diameter (i.e., a size in a direction perpendicular to the axis of the fiber filament) about eight times that of the main body of the fiber filament, and a length about three times the diameter of the main body of the fiber filament. In FIG. 9, another continuous, composite nodular portion is observed below the arrow.

Figure 10:
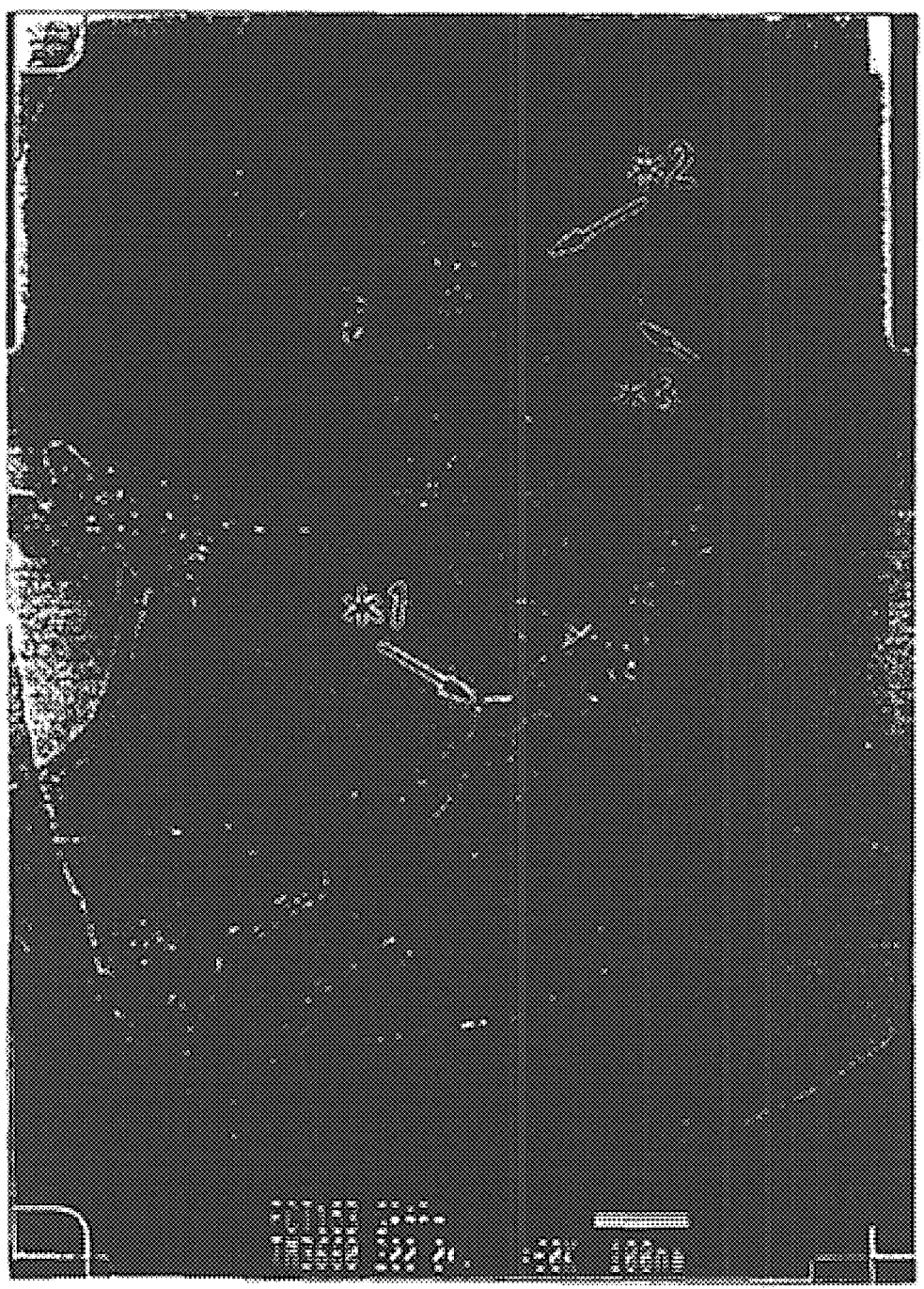

As shown in FIG. 10, a portion of a fine carbon fiber filament represented by an arrow *1 is thickened as shown in the schematic representation of FIG. 1, and the thickened portion has a diameter (i.e., a size in a direction perpendicular to the axis of the fiber filament) about three times that of the main body of the fiber filament, and a length about twice the diameter of the main body of the fiber filament. In the thickened portion (i.e., nodular portion), carbon layers are grown in an orderly fashion as in the case of carbon layers constituting the main body of the fiber filament. A site represented by an arrow *2 has continuous nodular and non-uniform shape portions of complicated shape as shown in the schematic representation of FIG. 3 on the surface of a carbon fiber filament. The continuous, composite nodular portion has a diameter (i.e., a size in a direction perpendicular to the axis of the fiber filament) about three times that of the main body of the fiber filament, and contains, in its interior, carbon particles. A site represented by an arrow *3 has a nodular portion formed on one side of a carbon fiber filament as shown in the schematic representations of FIGS. 4 and 5, the nodular portion having a diameter about twice that of the main body of the fiber filament.

Figure 11:
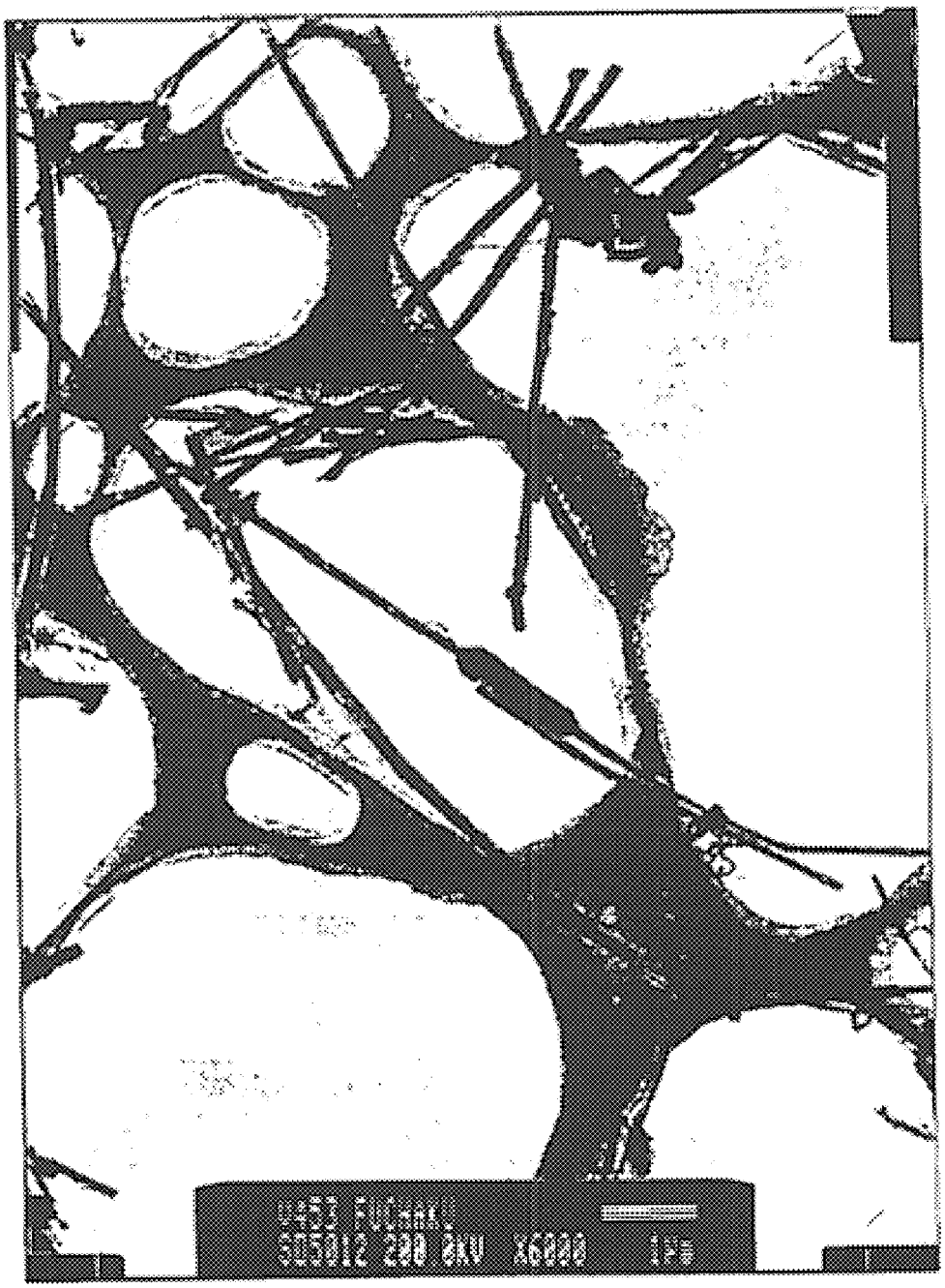

As shown in FIG. 11, a portion of a fine carbon fiber filament is thickened. The thickened portion (i.e., nodular portion) has a sheath structure, and has a diameter about four times that of the main body of the fiber filament, and a length about 20 times the diameter of the main body of the fiber filament. Observation of an enlarged micrograph of the nodular portion revealed that, although a portion of the nodular portion was deformed (lost), the nodular portion was formed of carbon layers grown in an orderly fashion. Therefore, the nodular portion was considered to have a cavity in its interior.

Figure 12:
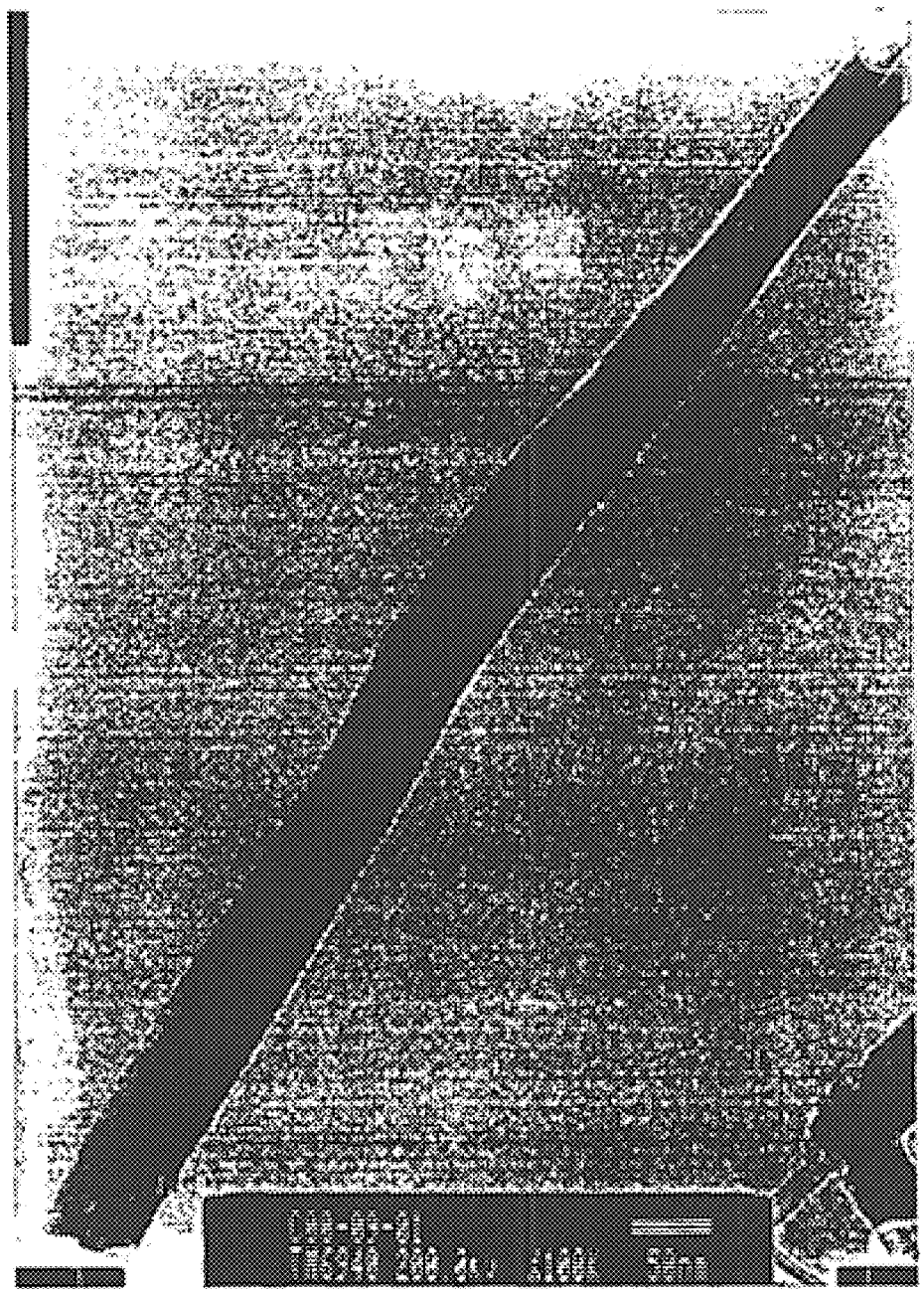

FIG. 12 shows a portion of a fiber filament of a fine carbon fiber including an outwardly enlarged portion as schematically illustrated in FIG. 6. The thickness or diameter (cross-sectional direction size ) of the outwardly enlarged portion is about 1.3 times the diameter of the body of the fine carbon fiber filament and the length of the portion is about 5 times the diameter of the body of the fine carbon fiber filament.

Figure 13:
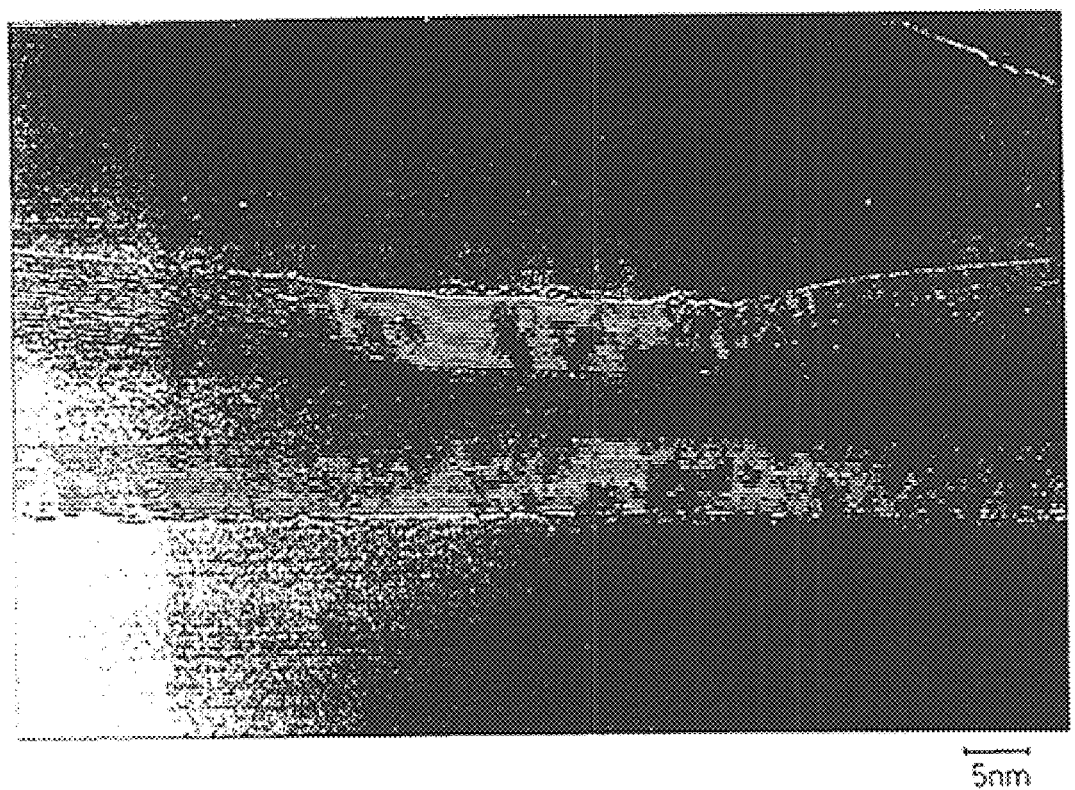

FIG. 13 is a photograph of a high resolution TEM of same fine carbon fiber as of FIG. 12, though the FIG. 12. The photograph is different form that of the diameter of a fine carbon fiber filament where the diameter of the central hollow space varies. The variation of the diameter of the fine carbon fiber of FIG. 12 along the length of the fine carbon fiber is shown in FIG. 7. The diameter of the fine carbon fiber filament and repeated outwardly enlarged portions had a diameter of about 1.05 to about 2 times and a length of about 2 to about 200 times the diameter of the body of the fine carbon fiber filament.

The fine carbon fiber of the Example was found to contain carbon fiber filaments having the aforementioned structures as shown in FIGS. 9 through 13 in amounts of 50% or more.

COMPARATIVE EXAMPLE

As schematically shown in FIG. 8, the raw material feed pipe 14 for feeding a raw material which had been gasified in the raw material gasification apparatus 15 and the carrier gas feed pipe 16 were provided on the top of the vertical heating furnace 11 (inner diameter: 170 mm, length: 1,500 mm).

Toluene containing ferrocene (4 mass %) and thiophene (0.5 mass % (0.2 mass % as reduced to atomic sulfur)) was gasified, the gasified product was fed through the raw material feed pipe 14 at a rate of 15 g/minute while the temperature of the product was maintained at 200° C., and hydrogen serving as a carrier gas was fed at a rate of 180 liters/minute, to thereby allow reaction to proceed.

Fine carbon fiber produced through the above reaction was subjected to heat treatment at 1,300° C. in an argon (Ar) atmosphere. The thus-treated fine carbon fiber was further subjected to heat treatment at 2,800° C. in an Ar atmosphere, to thereby obtain fine carbon fiber (yield by mass: 96%).

Observation under a transmission electron microscope revealed that the fine carbon fiber of the Comparative Example has the same structure as that of the fine carbon fiber of Example, except that the fine carbon fiber of Comparative Example has a uniform diameter and no nodular portion.

(Preparation of Composite Material)

A composite material was prepared from polyacetal and each of the fine carbon fibers of Example and Comparative Example, and the resultant composite materials were subjected to measurement of tensile strength and volume specific resistance. The results are shown in Table 1.

TABLE 1

| Fine carbon fiber | Example 1 | Comparative Example 1 |
|---|---|---|
| Incorporation amount (mass %) | 15 | 15 |
| Tensile strength (MPa) | 70 | 58 |
| Volume specific resistance (Ω · cm) | $10^0$ | $10^0$ |

As is clear from Table 1, when reaction conditions are selected appropriately, the shape of the resultant fine carbon fiber is varied, and the fine carbon fiber exhibits excellent adhesion to a resin.

Industrial Applicability

According to the present invention, there can be provided fine carbon fiber, each fiber filament of the fiber having an outer diameter of about 1 to about 500 nm and an aspect ratio of about 10 to about 15,000, and having a nodular portion, the fine carbon fiber differing from conventional carbon fiber or vapor grown carbon fiber. The fine carbon fiber of the present invention is useful as, for example, a gas occlusion material or an electrically conductive filler employed in resin.

What is claimed is:

1. A fine carbon fiber, the main body of each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers around the hollow space, wherein the fiber filament has a nodular portion which is formed of outwardly protruding carbon layers or formed of a locally increased number of carbon layers, said nodular portion having a cavity in its interior.

2. The fine carbon fiber according to claim 1, wherein the ratio of the diameter (d') of a fiber filament of the fiber as measured at a position at which a nodular portion is present on the surface of the filament to the diameter (d) of a fiber filament of the fiber as measured at a position at which no nodular portion is present; i.e., d'/d, is more than about 1.5 and not more than about 10.

3. The fine carbon fiber according to claim 1 or 2, wherein the nodular portion present on the surface of a fiber filament of the fiber contains, in its cavity, hollow fine carbon particles or carbon, or a metal or a metallic compound.

4. The fine carbon fiber according to claim 1 or 2, wherein the nodular portion present on the surface of a fiber filament of the fiber is formed from carbon, and has a sheath structure extending along the center axis of the fiber filament.

5. A fine carbon fiber, each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers around the hollow space, wherein the fiber filament has repeatedly outwardly enlarged portions and the diameter of the fiber filament varies along the length of the fiber filament, the fiber filament having a first side wall portion (1) and a second side wall portion (2), with only one of the side wall portions (1) or (2) being enlarged, the ratio of the diameter (d") of a fiber filament of the carbon fiber as measured at the outwardly enlarged portions to the diameter (d) of a fiber filament of the carbon, fiber as measured at a position at which no outwardly enlarged portions is present; i.e., d"/d, being about 1.05 to about 3.

6. A fine carbon fiber, each fiber filament of the fiber having an outer diameter of about 1 to about 500 nm and an aspect ratio of about 10 to about 15.000 and comprising a hollow space extending alone its center axis and a multi-layer sheath structure consisting of a plurality of carbon layers around the hollow space, wherein the fiber filament has repeatedly outwardly enlarged portions and the diameter of the fiber filament varies along the length of the fiber filament, the ratio of the diameter (d") of a fiber filament of the carbon fiber as measured at the outwardly enlarged portions to the diameter (d) of a fiber filament of the carbon fiber as measured at a position at which no outwardly enlarged portions is present; i.e., d"/d, being about 1.05 to about 3, wherein the filament of the fine carbon fiber has locally thicker carbon multi-layer structure portions containing voids in the carbon multi-layer structure.

7. The fine carbon fiber according to claim 5 or 6, wherein the length of the outwardly enlarged portions of a fiber filament of the carbon fiber is about 2 to about 200 times the diameter (d) of the fiber filament.

8. A fine carbon fiber, the main body of each fiber filament of the fiber having an outer diameter of about 1 to about 500 nm and an aspect ratio of about 10 to about 15,000 and comprising a hollow space extending along its center axis and a multi-layer sheath structure consisting of a plurality of carbon layers around the hollow space, wherein the fiber filament has a nodular portion which is formed of outwardly repeatedly carbon layers or formed of a locally increased number of carbon layers, wherein the ratio of the diameter (d') of a fiber filament of the fiber as measured at a position at which a nodular portion is present on the surface of the filament to the diameter (d) of a fiber filament of the fiber as measured at a position at which no nodular portion is present; i.e., d'/d, is more than about 1.5 and not more than about 10, wherein the nodular portion present on the surface of a fiber filament of the fiber is formed from carbon, and has a sheath structure extending along the center axis of the fiber filament, the nodular portion having a length about 2 to about 30 times the diameter (d).

9. A fine carbon fiber in which the fine carbon fiber according to any one of claims 1, 5, 6 or 8 occupies about 5 to about 95% by mass in a fine carbon fiber having an outer diameter of about 1 to about 500 nm and an aspect ratio of about 10 to about 15,000.

10. A fine carbon fiber composition comprising a resin or a rubber and having a fine carbon fiber according to any one of claims 1, 5, 6 or 8 contained therein.

* * * * *